Sept. 5, 1950   R. C. HOY   2,520,934
AIRCRAFT CONTROL SURFACE RIGGING PROTRACTOR
Filed Nov. 19, 1947
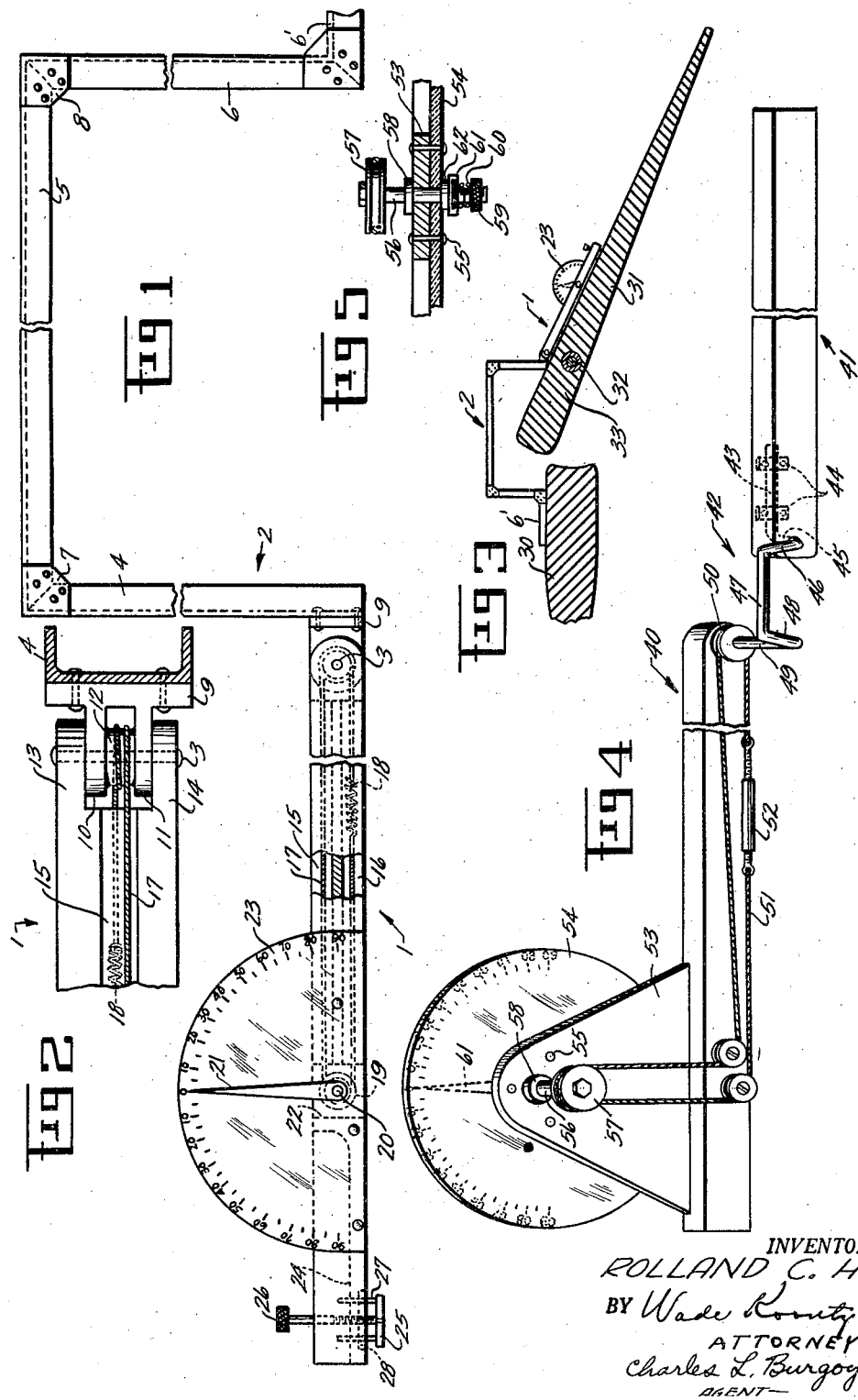
INVENTOR.
ROLLAND C. HOY
BY Wade Kountz
ATTORNEY and
Charles L. Burgoyne,
AGENT Patented Sept. 5, 1950

2,520,934

UNITED STATES PATENT OFFICE 2,520,934

AIRCRAFT CONTROL SURFACE RIGGING PROTRACTOR

Rolland C. Hoy, Osborn, Ohio

Application November 19, 1947, Serial No. 786,942

5 Claims. (Cl. 33—75)

(Granted under the act of March 3, 1883, as amended April 30, 1928; 370 O. G. 757)

The invention described herein may be manufactured by or for the United States Government for governmental purposes without payment to me of any royalty thereon.

The present invention relates to an aircraft control surface rigging protractor of universal application in adjusting the actuating means of aircraft control surfaces or other movable airfoils.

The primary object of the invention is to provide a protractor having two pivotally connected portions adapted to be placed in contact with two adjacent and relatively movable airfoil members and having an indicating means to register the angle between the relatively movable members.

A further object of the invention is to provide a reliable protractor particularly for use in rigging the actuating means for aircraft control members, and including a dial and pointer to show the angle between two adjacent and relatively movable airfoil members.

Another object of the invention is to provide a protractor adapted to accurately measure the angular displacement of various aircraft control surfaces such as rudders, ailerons, elevators, wing flaps and trim tabs.

Another object of the invention is to generally improve the construction of and extend the field of usefulness of protractors.

The above and other objects of the invention will become apparent upon reading the following detailed description in conjunction with the accompanying drawing, in which:

Fig. 1 is a side elevation view of the protractor in one form of construction.

Fig. 2 is an enlarged fragmentary plan view of the hinge joint used in the protractor of Fig. 1.

Fig. 3 is a view taken in horizontal cross section through an aircraft rudder assembly and showing the protractor of Fig. 1 in use for measuring rudder displacement away from neutral position.

Fig. 4 is a perspective view of the protractor in another form of construction.

Fig. 5 is a horizontal cross section taken through the shaft and pointer axis in the construction of Fig. 4.

Referring to the drawing and particularly to Fig. 1 thereof it may be seen that the protractor comprises two members 1 and 2 pivotally connected together by means of a hinge pin 3. The members 1 and 2 are preferably made of aluminum or other light weight material. The member 1 is straight from end to end, but the member 2 is a three-sided frame-like structure including three elements 4, 5 and 6 of channel-shaped cross section. The elements 4, 5 and 6 are joined at right angles as shown by means of two similar pairs of gusset plates indicated at 7 and 8, which plates are fastened securely by rivets passing through the side walls of the channel-shaped elements 4, 5 and 6. While the members 1 and 2 may be proportioned to suit current needs or convenience a working example as used on larger aircraft includes a member 1 about fifteen inches long, elements 4 and 6 each about fourteen inches long and an element 5 about eighteen inches long. The purpose of the frame-type of construction for the member 2 is to take care of rudder measurements on aircraft wherein the rudder includes a balancing extension forwardly of the rudder hinge pin (see Fig. 3). This extension may thus swing into the space provided by the frame. Riveted to the lower end of the element 4 is a hinge member 9 having integral legs 10 and 11 which are integrally joined by means of an actuating pulley 12.

The member 1 includes the two leg or knuckle portions 13 and 14 which are connected by the hinge pin 3 to the legs 10 and 11 of the hinge member 9 (see Fig. 2). The top and bottom surfaces of the member 1 are longitudinally grooved as at 15 and 16 to provide free space for an actuating cable 17 extending around the pulley 12. The cable is preferably a braided wire string and if desired may make a turn and a half around the pulleys to eliminate slippage, although this is not considered at all necessary. It is also possible to use instead of wire cable, a band or belt of textile material impregnated with rubber or other binder. In this case the belt should only make a half turn around the actuating pulleys. The cable 17 includes a spring or other tightening means 18 as shown. The cable 17 also extends into driving contact with another pulley 19 fixed on the pointer shaft 20. This pulley 19 and the actuating pulley 12 are of the same diameter, so that the angular displacement of the members 1 and 2 will be translated into similar displacements of the pointer 21 carried on the shaft 20. The driven pulley 19 is mounted within the confines of member 1 in a rectangular space 22 provided therethrough from top to bottom. Mounted on the member 1 between the side surface thereof and the pointer is a dial 23, which is secured on the member 1 by means of screws or other fastening elements. The dial which is semi-circular in shape is preferably of a transparent sheet material and is graduated in degrees beginning at zero in the center and going up to 90° on either side of the center or neutral point. Instead of fixing the pointer 21 rigidly on the shaft 20 there may be a slip joint, as shown in Fig. 5, to aid in setting the pointer on the zero point or in making an arbitrary setting thereof as convenience may dictate.

The dial carrying member 1 is hollowed out as at 24 so as to be of L-shaped cross section for a substantial portion of its length, thus lightening the device. At the free end of the member 1 there is provided an adjustable foot 25, to aid in steadying the member 1 when it must be used on an airfoil having a convex outer surface. Similar means may be employed at other points along the length of the member 1 if the airfoil surface on which it is to be positioned is excessively rounded or bulged. The foot member 25 is adjustable up or down by means of a thumb screw 26 which threads through the member 1 and is rotatably mounted in the foot member 25. To prevent the member 25 from turning about the screw 26 a pair of guide pins 27 are provided on the member 25, and slidably mounted with respect to the member 1. The foot member 25 may be completely retracted into a recess 28 formed in the lower surface of the member 1.

Referring now to Fig. 3 it will be seen that one use for the protractor is in measuring the angular deviation of an aircraft rudder from the neutral position. As seen in cross section there is a vertical fin or stabilizer member 30 which is carried at the rear end of the aircraft fuselage, and mounted rearwardly thereof is a rudder 31 rotatable with respect to the hinge pin 32. Forwardly of the hinge pin the rudder includes a balancing extension 33 for reducing the turning effort required to move the rudder from neutral position. The rudder being operated in either direction by means of cables, it is necessary when rigging the cables to make sure that the rudder may be turned equal angles in opposite directions away from the neutral position. Thus with the rudder control in one extreme of its movement the rudder is set at a known maximum angle for the type of aircraft being rigged. This angle may be read directly on the dial 23 with the members 1 and 2 of the protractor held firmly against the aircraft control surfaces, as shown in Fig. 3. After the rudder control cables have been properly connected to the rudder control and to the rudder, the control is moved to the other extreme of movement and the rudder displacement in the other direction is checked while maintaining the protractor in the same relative position as shown in Fig. 3. Of course the pointer 21 will automatically move to the other side of the zero point in making this check of the rigging. It is to be understood that all types of airfoil control elements may be similarly rigged by the use of the protractor, and at any time may be checked against the standards prescribed for the particular aircraft being inspected. For example on one type of airplane the elevator is supposed to be capable of a thirty degree Up elevator movement and a twenty-five degree Down elevator movement.

Considering now the second form of protractor construction, reference is made to Fig. 4. The protractor of Fig. 4 includes two main members 40 and 41 pivotally connected together by means of a rod or hinge member 42. Both of the members 40 and 41 are straight throughout their length and may be made of wood, aluminum, magnesium or any suitable light weight material.

The length of the two members may be chosen at random, but is usually governed by the size of the aircraft to some extent. It is suggested that the members 40 and 41 be somewhere between fourteen and twenty inches long. The hinge member 42 is a single piece of steel rod material taken from one-fourth or five-sixteenths round stock and bent to the particular configuration shown. The main member 41 is fixed to the rod by means of a straight portion 43 thereof which seats in a groove formed in the member 41, and held therein by a pair of small plates 44 rigidly secured to the member 41, by suitable fasteners. The rod includes a short portion 45 extending through the member 41 and continuing into consecutive portions 46, 47, 48 and 49. The arch or frame construction formed by the portions 46, 47 and 48 may have various shapes either curved or square, but in any case this feature is for the purpose of getting around or over obstructions such as hinge joints or flanges or extensions adjacent such joints. In a satisfactory model of the protractor where the members 40 and 41 are fifteen inches long, the rod 42 is proportioned so that the rod portions 46 and 48 are one inch long and the rod portion 47 is four inches long. The rod portion 49, which is long enough to allow the members 40 and 41 to fold up in side-by-side relation, extends through the member 40 and is rotatably mounted therein. Rigidly mounted on the rod portion 49 is an actuating pulley 50, over which is trained an actuating cable or belt 51. Mounted on the cable between the ends of member 40 is a turnbuckle 52 adapted for tensioning the cable to secure the best driving results therefrom.

The protractor member 40 has a standard 53 mounted thereon which serves to carry the circular dial 54 of transparent material fastened to the standard by screws or rivets 55. The dial is graduated in degrees around its periphery in a manner similar to the dial 23 of Fig. 1. Extending through the standard 53 and through the center of dial 54 is a shaft 56 having a drive pulley 57 thereon over which extends the cable 51. The pulley 57 has the same outside diameter as the pulley 50 so that the angular movements of the member 41 with respect to the member 40 will read directly on the dial 54. Noting Fig. 5 in particular it will be observed that the shaft 56 has an integral shoulder 58 thereon which positions the shaft and pulley with respect to the standard 53. The end of the shaft opposite to the pulley carrying end is threaded to receive a nut 59 under which is mounted a coil spring 60, pointer 61 and a nut 62 forming a shoulder for the pointer. Thus the pointer will normally turn with the shaft and pulley but may be turned independently thereof to select an arbitrary zero setting thereof. With the members 40 and 41 in extended relation as shown the protractor is adapted for use in measuring the angular displacement of aircraft rudders, wing flaps and other movable control surfaces in a manner similar to the procedure shown in Fig. 3. It should be understood however that either of the members 40 or 41 may usually be held in contact with the movable control surface.

In using the protractor of Fig. 4 on elevator and aileron measurements it is often preferred to rotate the two members 40 and 41 into a side-by-side relation with the pointer turned to zero setting. Then one of the members 40 or 41 may be positioned on a fixed surface of the airplane adjacent to the inner end of the elevator or aileron with the other member in contact with the adjacent end portion of the elevator or aileron. Relative movement of the fixed and movable portions of the aircraft will actuate the cable and also the pointer to indicate the amount of angular displacement on the indicating dial.

The protractor constructions described and illustrated are adapted for a wide variety of uses in measuring angles of movable members on aircraft. However the protractors disclosed are equally useful in measuring angles of relatively fixed members in structures of all kinds. The embodiments of the invention as illustrated in the drawing employ a cable and pulleys to actuate the pointer, but it should be understood that other types of actuating means such as a chain and sprockets may be substituted if desired. If desired there may also be an extension 6' provided on the free end of the member 2 of Figs. 1 and 3 extending outwardly at a right angle to the element 6, so as to furnish a more extensive supporting surface for contact with an airfoil member such as the vertical fin or stabilizer 30 of Fig. 3.

The two forms of protractor as exemplified by Figs. 1 and 4 are similar in all the essential parts thereof. Both have a bar or member carrying an indicator dial and adapted for lengthwise contact with an airfoil or control surface of an aircraft. Both have another member pivotally connected to the first member and including an arch-like portion adjacent to the pivotal connection with the arch-like portion terminating in a surface engaging bar which is adapted for lengthwise contact with an adjacent surface of the aircraft. Both have a cable and pulley means to actuate an indicating pointer rotatably mounted on the indicator dial. The only marked difference in the two embodiments of the invention is in the relative proportions of the arch-like portion with respect to the surface engaging members or bars. Thus in Fig. 1 the arch is relatively large for clearing a rudder balancing extension 33 (see Fig. 3) which is quite large, as found for instance on a certain heavy bombing plane. In Fig. 4 the arch is relatively small for merely getting around simple aileron or wing flap hinges, which would prevent good contact between the surface engaging members and the aircraft surfaces whose angular displacements are being measured.

The embodiments of the invention herein shown and described are to be regarded as illustrative only and it is to be understood that the invention is susceptible to variations, modifications and changes within the scope of the appended claims.

I claim:

1. A protractor comprising, a pair of surface engaging members, means providing a pivotal connection between said members at one end of each member, a graduated dial mounted on one member, a rotatable pointer mounted on said dial and adapted to indicate angular displacements on the graduations of said dial, a pulley rotatable with said pointer, a pulley rotatable with the other member and being coaxial with respect to said pivotal connection, an actuating cable trained over said pulleys to actuate said pointer in response to relative angular movements of said one member relative to said other member, and said means providing the pivotal connection between said members comprising a rod element rigid with respect to said other member and including an arched portion between the connected ends of said members.

2. A protractor comprising, a pair of surface engaging members, means providing a pivotal connection between said members, a first pulley rotatably mounted on one of said members and spaced from said pivotal connection, a second pulley rotatable with the other member and being coaxial with respect to said pivotal connection, an actuating cable trained over said pulleys, means actuated by said first pulley to indicate the relative angular movements of said one member relative to said other member, said means providing the pivotal connection between said members comprising a rod element rigid with respect to said other member and having an end portion extending at a right angle with respect to the length of said members, and said end portion being rotatably connected to said one member and having said second pulley rigidly mounted thereon.

3. A protractor comprising, a straight elongated surface engaging member, a graduated dial rigidly mounted on said member, a rotatable pointer mounted on said dial and adapted to indicate angular displacements on the graduations of said dial, a first pulley rotatable with said pointer at the center of rotation thereof, another surface engaging member including an obstruction bridging arch at one end thereof, means at one end of said arch and at one end of said straight elongated surface engaging member for pivotally connecting said surface engaging members together with the axis of the pivotal connecting means passing through said straight elongated surface engaging member and extending at a right angle to the plane of said arch, a straight elongated surface engaging section forming part of said other surface engaging member and having one end rigidly connected to said arch at the other end of the arch, a second pulley rigidly mounted on said other surface engaging member and coaxial with respect to said pivotal connecting means, and cable means trained over said pulleys to actuate said pointer in response to relative pivotal movement of said surface engaging members about said pivotal connecting means.

4. A protractor as defined in claim 3, including a transversely adjustable surface engaging foot adjacent to the other end of said straight elongated surface engaging member.

5. A protractor comprising, a pair of straight elongated surface engaging members, means providing a pivotal connection between said members, a first pulley rotatably mounted on one of said members and spaced from said pivotal connection, rotatable indicating means actuated by said first pulley to indicate the relative angular displacement thereof, said means providing the pivotal connection between said surface engaging members comprising a rod element having one straight end portion journaled in said one surface engaging member at one end thereof and extending laterally therefrom at a right angle to the longitudinal axis of said one surface engaging member, a second pulley rigidly mounted on said straight end portion, said rod element further including an arch portion at the free end of said straight end portion and lying in a plane at a right angle to said straight end portion, said rod element further including means rigid therewith for connecting said arch portion in rigid relation with respect to said other surface engaging member with the longitudinal axis of said other surface engaging member extending in a direction parallel to the plane of said arch portion, and cable means trained over said pulleys to actuate said rotatable indicating means in response to relative pivotal movement of said surface engaging members.

ROLLAND C. HOY.

REFERENCES CITED

The following references are of record in the file of this patent:

UNITED STATES PATENTS

| Number | Name | Date |
|---|---|---|
| 581,559 | Janes et al. | Apr. 27, 1897 |
| 1,018,790 | Suddoth | Feb. 27, 1912 |
| 1,058,512 | Aanstoots | Apr. 8, 1913 |
| 1,269,324 | Shaver | June 11, 1918 |
| 2,000,926 | Cox | May 14, 1935 |
| 2,023,539 | Packard | Dec. 10, 1935 |
| 2,064,430 | Johnson | Dec. 15, 1936 |
| 2,276,153 | Burnham | Mar. 10, 1942 |